D. Wolf.
Harvester Droppers.
N° 64615 — Patented May 7, 1867
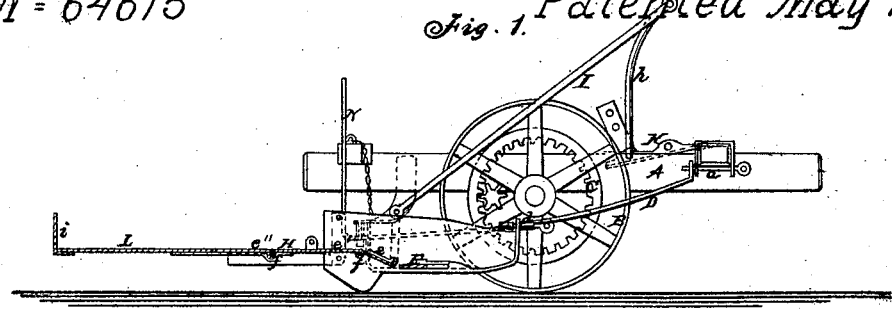
Fig. 1.
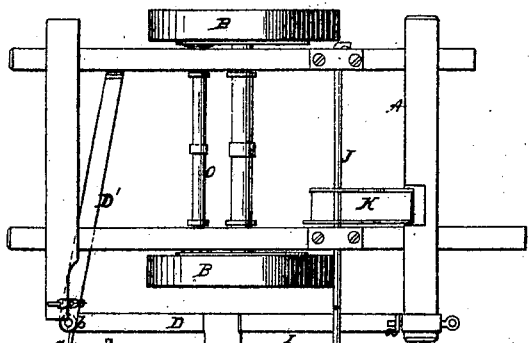
Fig. 2.
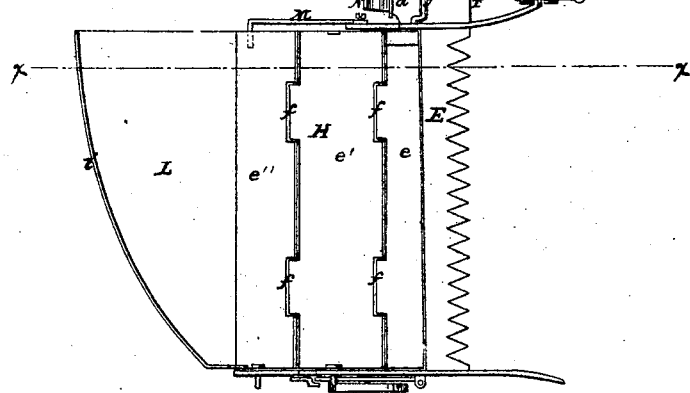
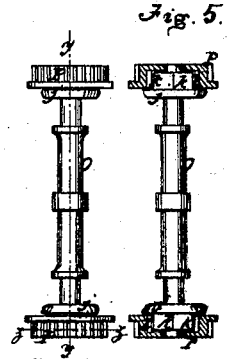
Fig. 4. Fig. 5.
Fig. 6.
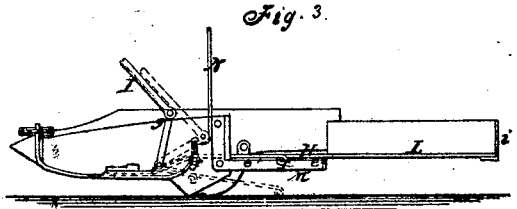
Fig. 3.
Witnesses.
F. A. Jackson
Chicago Ill.
Inventor
David Wolf
Per Munn & Co.
Attorneys

United States Patent Office.

DAVID WOLF, OF LEBANON, PENNSYLVANIA.

Letters Patent No. 64,615, dated May 7, 1867.

IMPROVEMENT IN HARVESTERS.

*The Schedule referred to in these Letters Patent and making part of the same.*

TO ALL WHOM IT MAY CONCERN:

Be it known that I, DAVID WOLF, of Lebanon, in the county of Lebanon, and State of Pennsylvania, have invented a new and improved Harvester; and I do hereby declare that the following is a full, clear, and exact description thereof, which will enable those skilled in the art to make and use the same, reference being had to the accompanying drawings, forming part of this specification, in which—

Figure 1 is a side sectional view of my invention, taken in the line $x\ x$, fig. 2.

Figure 2, a plan or top view of the same.

Figure 3, an inner side view of the grain-platform.

Figures 4 and 5, detached views of the shaft, by which the sickle is driven, fig. 5 having the toothed wheels upon it in section, as indicated by the line $y\ y$; and Figure 6, a section of fig. 4, taken in the line $z\ z$.

Similar letters of reference indicate corresponding parts.

This invention relates to a new and improved harvester, and it consists in a novel construction of the platform, as hereinafter fully shown and described, whereby the cut grain may be readily discharged therefrom, and kept free from the sickle as it is cut.

A represents the main frame of a harvester mounted on two wheels, B B, each of which has a concentric toothed rim, C, attached to or cast with it. D D' represent two bars, one of which, D, is attached by a pivot-bolt, $a$, to the right-hand side of the front part of the main frame A, and the rear end connected by a pin or bolt, $b$, to one end of the other bar D'; the opposite end of the bar D' being attached by a pivot-bolt, $c$, to the left-hand side of the main frame A, as shown clearly in fig. 2. E represents the cutter-bar, which has a shoe, F, attached to its inner end. The front end of this shoe is connected by a joint, $d$, to the bar D at about its centre, and the rear end of the shoe F is connected by a similar joint, $d'$, to a plate, G, which is attached to the bars D D' where they are connected by the pivot-bolt $b$, said bolt forming a pintle of a hinge common to the bars D D' and to the plate G. By this arrangement the cutter-bar, and consequently the platform H, which is attached to it, is allowed to rise upward from the joints $d\ d'$ as centres, and the inner end of the cutter-bar is also allowed to rise, owing to a vertical movement allowed the bars D D'. The cutter-bar, therefore, is allowed to conform to the inequalities of surface over which it may pass, and by withdrawing the bolt of the joint $d$, the cutter-bar may, when the whole of the platform is not attached, be turned around to the rear of the main frame A, and suspended therefrom, where it will be out of the way, and the device rendered convenient for moving from place to place. The platform is a jointed one, composed of three parts, $e\ e'\ e''$, connected by joints or hinges, $f$, and the front part $e$ has a bent arm, $g$, secured to one end of it, on which a rod, I, is fitted, the front end of said rod being fitted on an upright arm, $h$, at one end of a shaft, J, which is placed in the front part of the main frame A, and has a stirrup or foot-piece, K, secured upon it. By actuating the shaft J through the medium of the foot-piece K, the jointed platform may be moved so as to discharge the cut grain therefrom, the cut grain falling upon the platform, when the front joint or hinge $f$ is depressed, and whenever said joint or hinge is raised the cut grain will be discharged from the platform, the parts L in this operation being removed from the platform. In case it is desired to rake the cut grain from the platform a supplemental part, L, is attached to the rear part $e''$ of the platform H, said part having an upright flange, $i$, attached to hold the grain on L, and admit of a person raking the cut grain therefrom. This supplemental part L of the platform rests upon a bent arm, M, attached to the shoe F. A lever, N, is attached to the shoe F to admit of the driver raising the outer end of the cutter-bar and platform whenever required. O is the shaft, from which the sickle is driven. This shaft is fitted in proper bearings in the main frame A, and it is provided with a collar, $j$, near each end, and having upon it, adjoining the collar, teeth $k$, as shown clearly in fig. 6. On the outer ends of the shaft O there are fitted pinions P which are recessed, or have cavities $l$ made in them, with elastic pawls $m$ to catch against the teeth $k$, when the machine is moving in a forward direction, and thereby rotate the shaft O. The pinions are rotated by the geared or toothed rims C C. In backing the machine the pawls $m$ slip over the teeth $k$. By this arrangement the pawls and teeth are preserved from all dust, as they are completely enclosed. The pinions, it will be seen, are simply fitted loosely on the shaft O, and they can be removed with the greatest facility, and reversed on the shaft O, that is to say, the pinion on one end of the shaft, which rotates the shaft when the machine is moving in a forward direction, may be taken off and applied to the opposite end of said shaft without rotating the same when the machine is moving in a forward direction. By thus shifting the pinions P the machine may be drawn from place to place, with communicating motion to the sickle-bar. A bevel-wheel is to be secured on shaft O, meshing with another bevel on a shaft bearing the crank, by which motion can be communicated to the sickle.

Having thus described my invention, what I claim as new, and desire to secure by Letters Patent, is—

The flanged extension part L, in combination with the hinged-jointed platform H, substantially as and for the purpose described.

DAVID WOLF.

Witnesses:
ANTHONY S. ELY,
JOHN ULRICH.